Patented May 10, 1938

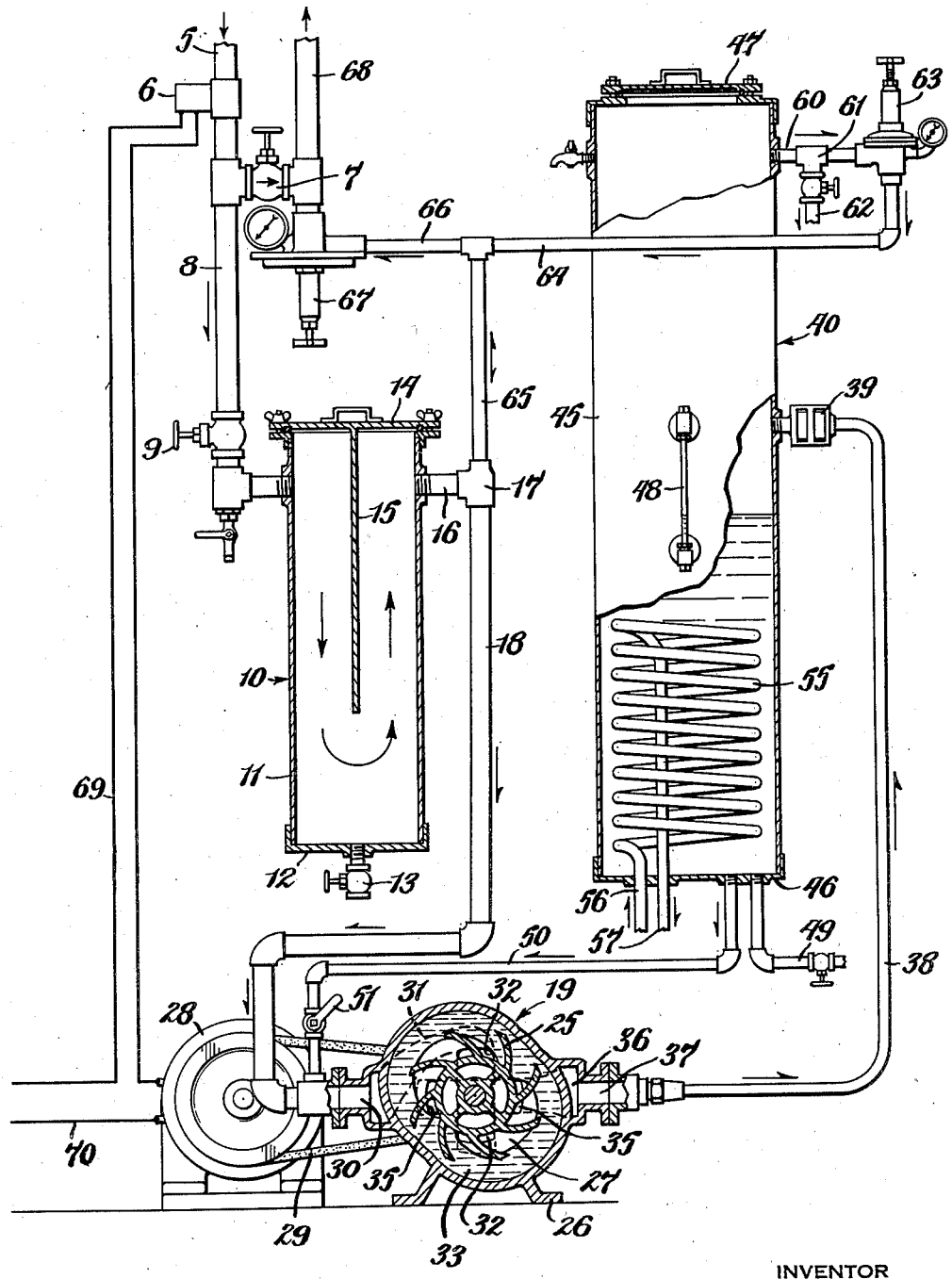

2,116,939

UNITED STATES PATENT OFFICE 2,116,939

METHOD AND APPARATUS FOR CARBONATING BEVERAGES

Edward Zahm and George G. Zahm, Buffalo, N. Y., assignors to Zahm & Nagel Co. Inc., Buffalo, N. Y., a corporation of New York Application October 17, 1936, Serial No. 106,254

8 Claims. (Cl. 230—22)

This invention relates to a method and apparatus for carbonating beverages and more particularly to apparatus in which the carbon dioxide and contained flavors are passed directly from the fermenting tank to the carbonators instead of storing the gas at high pressures in storage tanks as has been the practice heretofore.

It has been the general practice to collect the carbon dioxide gas and contained flavors or esters from the fermenting wort and, by means of a compressor, pump the gas into a series of high pressure steel storage tanks in which the gas is maintained at about 250 pounds pressure. The beer is carbonated by means of any several mechanical devices used for this purpose, the carbon dioxide being taken from these high pressure storage tanks through a pressure reducing valve which delivers the gas at the pressure required for carbonating.

The carbon dioxide as taken from the fermenting wort carries with it flavors which are desirable in the carbonated beer and it is known that during the compressing process the heat of compression has the effect of destroying or deleteriously affecting these flavors. Compressors have been introduced into breweries in which the detrimental effects of the heat of compression have been sought to be overcome by cooling the compressor cylinders by means of water jackets or by injecting cooled water directly into the cylinders during compression. Such compressors have met with success in varying degrees. Also it is known that gas from fermentation when stored at high pressure does not improve in quality and is likely to deteriorate during storage.

It is the principal object of the present invention to provide a system in which the gas need not be compressed to a point above that required for the purpose of carbonating the beer and in which the gas is used in its fresh natural state. By this means the compression of the gas to high pressure, necessarily involving, of course, high temperatures in the heat of compression, is avoided, as well as the high pressure storage steps.

Another object is to provide such a system in which the apparatus adapts itself to all conditions encountered, such as fluctuating amounts of gas used in the carbonating apparatus and fluctuating amounts of gas generated in the fermentation tank, the compressed gas being under certain conditions by-passed back to the inlet of the compressor; under other conditions the excess being discharged from the system without going through the compressor, and the excess under other conditions being discharged from the system through the compressor.

The accompanying drawing is a side elevation, partly in section and partly schematic, of an apparatus for carrying out our invention.

The carbon dioxide together with the contained flavors is generated in the fermenting tank (not shown) by fermenting wort therein, the pressure in the fermenting tank being usually carried at about four pounds. The outlet line 5 from the fermenting tank carries the gas past a pressure switch 6, and past a by-pass valve 7 into a pipe 8 having a normally open shut-off valve 9 and discharging into the upper end of a foam trap 10. The purpose of the foam trap 10 is to entrain any slugs of foam which may be carried over by the gas from the fermenting tanks and consists of a vertical cylinder 11 having a bottom head 12 provided with a drain valve 13 and also having a removable upper head 14 and an internal partition 15. This partition extends about two-thirds of the way to the bottom of the foam trap so that the gases passing from the inlet 8 to the outlet 16 of the foam trap are required to pass down under the partition 15 and in doing so deposit any slugs of foam in the trap.

The outlet 16 from the foam trap is connected by a T 17 with the section line 18 to the compressor illustrated generally at 19.

The compressor 19 used is preferably of the hydraulic type known as "Hytor". Such compressors include a multi-vaned rotor 25 revolving in an elliptical casing 26, the rotor being so formed as to provide a series of chambers 27 disposed around a cylindrical hub. The rotor is driven by an electric motor 28, a belt drive 29 therebetween being illustrated. Both water and the carbon dioxide gas are introduced through the inlet 30 and pass through a passage 31 in the casing to two inlet ports 32 at the center of the motor. The water is thrown out in the form of a whirling ring 33 which fills those chambers 27 across the contracted part of the casing. As the chambers and water advance, the elliptical form of the casing permits the water to be thrown out of the filled chambers, drawing in the gas through the inlet ports 32, 32 of the casing. As these chambers advance the inlet ports are passed and thereafter the water is forced back into the gas filled chambers by the contracting form of the elliptical casing. As this occurs the gas filled chambers come into register with the outlet ports 35 in the casing through which the gas is discharged into a passage 36 which conducts it to the pump outlet 37.

In order to absorb the heat of compression of the gases, a continuous supply of water is provided, preferably cooled as hereinafter described and the compressor discharges both gas and water through a pipe 38 and sight glass 39 into the side of a receiver 40.

The receiver is shown as being in the form of a vertical cylinder 45 having a lower end head 46 and having a removable cover 47 enclosing its upper end. The water level in the receiver is preferably maintained about as shown and is rendered visible by a gage 48. Additional water is introduced from a valved water supply line 49 and the water for the operation of the pump passes out of the receiver through a pipe 50 connecting with the inlet 30 of the pump and having a valve 51 so that the flow of water to the pump is regulated.

To absorb the heat of compression, the water so recirculated through the compressor 19 and receiver 40 is artificially cooled. For this purpose a cooling coil 55 is submerged in the body of water in the receiver 40 and is provided with inlet and outlet connections 56 and 57, respectively, which extend through the lower head 46 of the receiver and through which a refrigerating medium such as brine, or a directly expanded refrigerant is supplied to the coil 55 so as to absorb the heat from the water supplied to the pump.

The gas outlet 60 from the receiver 40 connects with a T 61 one outlet branch of which connects with a valved line 62 leading to the carbonators (not shown). The other outlet branch of the T 61 connects with the inlet of a relief valve 63. This relief valve may be of any suitable form but is preferably of the sensitive diaphragm type and functions to permit gas to escape from the receiver 40 through its outlet line 64 whenever the quantity of gas handled by the compressor is in excess of that used by the carbonating apparatus, the gas so used passing out through the pipe 62. As it is desirable to supply gas to the carbonating apparatus at about thirty pounds pressure, the relief valve 63 is set to permit the discharge of gas when the receiver pressure rises above thirty pounds.

The outlet pipe 64 connects, through a pipe 65, with the T 17 in the compressor suction line and connects, through another pipe 66, to the inlet of a second relief valve 67. This relief valve is also preferably of the sensitive diaphragm type and permits the escape of gas from the system through a pipe 68. This pipe may vent to the atmosphere or may be connected to the inlet of a high pressure compressor (not shown) which may be used in compressing the excess gas for storage purposes. The purpose of the by-pass valve 7 and the valve 9 is to permit the entire apparatus to be cut out of service. Thus, by closing the valve 9 and opening the valve 7, the gas from the fermenting tanks passes directly to the excess gas discharge line 68 and thence to the high pressure compressor. The relief valve 67 preferably opens at slightly above four pounds pressure.

The pressure switch 6 is preferably of the Mercoid type and is connected in circuit with the power lines 69 and 70 to the compressor motor 28. Assuming that the relief valve 67 is set to discharge excess gas into the discharge line 68 on a rise in pressure to slightly above four pounds on the suction side of the compressor, the pressure switch 6 is preferably set to cut in at four pounds and cut out at one pound.

It is assumed, in the operation of the system, that the gas generated in the fermenting tanks is sufficient to supply the carbonating apparatus. If the demand becomes too large for the amount of gas generated, the pressure on the suction side of the compressor immediately drops and on reaching one pound pressure the pressure switch 6 is opened and the motor 28 cut out of operation thereby rendering the whole system inoperative until the pressure in the fermenting tanks builds up to four pounds pressure.

In the normal operation of the system different conditions will be encountered. Assuming that in starting the operation of the system, a low pressure exists in the fermenting tanks, this pressure will build up in the fermenting tank outlet line 5 until four pounds pressure is reached. At this pressure the pressure switch 6 is closed and the compressor motor 28 is energized. With the compressor 19 started, the carbon dioxide gas flows from the supply pipe 5 through the pipe 8 and past the open valve 9 into the foam trap 10, it being assumed that the valve 7 is closed. In the foam trap, the gas is caused to pass under the partition 15 and any entrained foam is removed and caught in the trap. The gas from the foam trap passes through the outlet 16, fitting 17 and into the suction line 18 to the compressor. The gas also, of course, fills the pipes 64, 65 and 66, but these lines are blocked by the closed relief valves 63 and 67.

The compressor 19 is supplied with cooled water from the receiver 40, and this water is thrown out in the form of the ring 33. Since the casing is elliptical, this water is progressively forced into and thrown out of the chambers 27 in the rotor. The gas inlet ports 32 are so disposed as to register with the chambers 27 as the water therein is being thrown out by centrifugal force so that the gas replaces the water and the gas outlet ports 35 are so disposed as to register with the chambers 27 as the water is being forced into the chambers so as to expel the gas from the chambers. It will therefore be seen that the gas is compressed and discharged with a certain amount of water through the line 28 into the receiver 40. The heat of compression in the compressor is absorbed by the water. The water discharged with the gas collects in the bottom of the receiver 40 and is cooled by the cooling coils 55 before passing through the line 50 back to the inlet of the compressor for reuse. It will therefore be seen that the temperature of the carbon dioxide gas is not appreciably raised during compression both because the pressures involved are low and also because the heat of compression is absorbed by the water and in turn absorbed by the cooling medium passing through the cooling coil 55.

The pressure in the receiver 40 is built up to thirty pounds, the pressure usually used in carbonating, the gas passing to the carbonating apparatus through the line 62. When the pressure rises above thirty pounds, the relief valve 63 opens and the excess gas is relieved into the pipe 64. Thus, the relief valve maintains the pressure in the receiver 40 at the proper pressure for carbonating.

The gas supplied from the fermenting tanks may be supplied in an amount greater, equal to or less than the capacity of the compressor. Assuming that the gas coming from fermentation is less than the quantity normally handled by the compressor, but greater than that used for carbonating, the excess of gas not used is relieved through the relief valve 63 and passes through the pipes 64 and 65 to the suction line 18 to the compressor, and is hence recompressed. This relief of the excess gas back to the suction of the compressor when the gas coming from fermentation is less than the capacity of the compressor prevents the compressor from lowering the pressure on its suction side to below one pound pressure, and thereby throwing the pressure switch to deenergize the motor, a condition obviously undesirable if the gas supplied by fermentation exceeds that required.

With an excess of supply over demand, even with a supply less than the capacity of the compressor, the excess gas must be relieved. Under such conditions the pressure in the lines connected to the pump suction builds up to over four pounds and opens the relief valve 67 permitting the escape of gas through the exhaust line 68. This gas may be vented or it may be picked up by a high pressure compressor and stored. At the same time, if the gas coming from fermentation is less than the capacity of the compressor, a part of the gas will pass through the pipe 65 and be recompressed.

In the event that the gas coming from fermentation is greater than the amount which can be handled by the compressor, the combined discharge of gas by the relief valve 63 and the excess generated in the fermenting tanks builds up the pressure in the line 66 above four pounds and the relief valve 67 is opened to relieve the excess. Under such conditions gas from the fermenting tanks will flow directly from the foam trap outlet 16 through the pipe 65 and there join the excess gas coming from the pipe 64 and relief valve 63 and be discharged through the relief valve 67.

From the foregoing, it will be seen that the present invention provides a method and apparatus for carbonating beverages in which the carbon dioxide coming from fermentation is used directly and in its fresh natural state for carbonating and is also compressed only to the pressure needed for carbonating and under conditions under which the heat of compression is continuously dissipated by a cooling medium so that the natural flavors in the gas are not injured. Further, the apparatus insures a constant supply of gas regardless of whether the gas coming from fermentation is greater or less than the quantity of gas handled by the compressor and the apparatus will function under varying conditions of gas supply and load to deliver gas at the pressure desired in the carbonating apparatus.

We claim as our invention:

1. In an apparatus for carbonating beverages with the gases coming from fermentation, a compressor having its suction connected with the source of said gases, means for maintaining the outlet pressure of said compressor at the desired carbonating pressure, means for conducting said compressed gases directly to the carbonators, said pressure maintaining means comprising a relief valve in said conducting means and discharging gas therefrom when the outlet pressure rises above the setting of said relief valve, means connecting the relief outlet from said relief valve with the suction of said compressor, a second relief valve and means connecting the relief outlet of said first relief valve and the suction of said compressor with said second relief valve, said second relief valve effecting a discharge of gas from the apparatus when the suction pressure of said compressor rises above the setting of said second relief valve.

2. In an apparatus for carbonating beverages with the gases coming from fermentation, a compressor having its suction connected with the source of said gases, means for maintaining the outlet pressure of said compressor at the desired carbonating pressure, means for conducting said compressed gases directly to the carbonators, said pressure maintaining means comprising a relief valve in said conducting means and discharging gas therefrom when the outlet pressure rises above the setting of said relief valve, means connecting the relief outlet from said relief valve with the suction of said compressor, a second relief valve, means connecting the relief outlet of said first relief valve and the suction of said compressor with said second relief valve, said second relief valve effecting a discharge of gas from the apparatus when the suction pressure of said compressor rises above the setting of said second relief valve, and means for cutting said compressor out of operation when the compressor suction pressure drops below a predetermined minimum and cutting said compressor into operation when the compressor suction pressure rises to slightly below the setting of said second relief valve.

3. In an apparatus for collecting gas from fermentation and supplying it to a carbonator, a compressor, means connecting the suction of said compressor to the source of said gas, means connecting the outlet of said compressor with a carbonator, means for returning the excess gas compressed to the suction of the compressor when the quantity of gas coming from fermentation is less than the quantity normally handled by the compressor, and means for discharging the excess of compressed gas from the apparatus when the supply of gas from fermentation exceeds the amount of compressed gas withdrawn from the apparatus for carbonating.

4. In an apparatus for collecting gas from fermentation and supplying it to a carbonator, a compressor, means connecting the suction of said compressor to the source of said gas, means connecting the outlet of said compressor with a carbonator, means for returning the excess gas compressed to the suction of the compressor when the quantity of gas coming from fermentation is less than the quantity normally handled by the compressor, and means for discharging excess of compressed gas from the apparatus when the gas coming from fermentation is equal to or in excess of the quantity handled by the compressor.

5. In an apparatus for collecting gas from fermentation and supplying it to a carbonator, a compressor, means connecting the suction of said compressor to the source of said gas, means connecting the outlet of said compressor with a carbonator, means for returning the excess gas compressed to the suction of the compressor when the quantity of gas coming from fermentation is less than the quantity normally handled by the compressor, means for discharging excess of compressed gas from the apparatus when the gas coming from fermentation is equal to or in excess of the quantity handled by the compressor, and means for discharging excess of uncompressed gas from the compressor suction when the supply of gas from fermentation is in excess of the quantity handled by the compressor.

6. In an apparatus for collecting gas from fermentation and supplying it to a carbonator, a compressor, means in said compressor for absorbing the heat of compression of the gases therein, means connecting the suction of said compressor to the source of said gas, means connecting the outlet of said compressor with a carbonator, means for returning the excess gas compressed to the suction of the compressor when the quantity of gas coming from fermentation is less than the quantity normally handled by the compressor, means for discharging excess of compressed gas from the apparatus when the gas coming from fermentation is equal to or in excess of the quantity handled by the compressor, and means for discharging excess of uncompressed gas from the compressor suction when the supply of gas from fermentation is in excess of the quantity handled by the compressor.

7. In an apparatus for collecting gas from fermentation and supplying it to a carbonator, a compressor, means connecting the suction of said compressor to the source of said gas, means connecting the outlet of said compressor with a carbonator, means for admitting water to the compression chamber of said compressor, a receiver receiving the discharged gas and water from said compressor, means for cooling the water collecting in said receiver, means for returning the cooled water from said receiver to said water admitting means, a conduit for withdrawing the compressed gas from said receiver, a relief valve for relieving gas from said receiver when the pressure rises above a predetermined pressure, and means for connecting the relief outlet of said relief valve jointly with the suction of said compressor and also with a second relief valve, said second relief valve discharging gas from the apparatus when the pressure on the suction side of said compressor rises above a predetermined amount.

8. In an apparatus for collecting gas from fermentation and supplying it to a carbonator, a compressor, means connecting the suction of said compressor to the source of said gas, means connecting the outlet of said compressor with a carbonator, means for admitting water to the compression chamber of said compressor, a receiver receiving the discharged gas and water from said compressor, means for cooling the water collecting in said receiver, means for returning the cooled water from said receiver to said water admitting means, a conduit for withdrawing the compressed gas from the receiver, a relief valve for relieving gas from said receiver when the pressure rises above a predetermined pressure, means for connecting the relief outlet of said relief valve jointly with the suction of said compressor and also with a second relief valve, said second relief valve discharging gas from the apparatus when the pressure on the suction side of said compressor rises above a predetermined amount, and means for cutting said compressor out of operation when the compressor suction pressure drops below a predetermined minimum and cutting said compressor into operation when the compressor suction pressure rises to slightly below the setting of said second relief valve.

EDWARD ZAHM.
GEORGE G. ZAHM.